United States Patent [19]
Wendel et al.

[11] 3,920,291
[45] Nov. 18, 1975

[54] RESILIENTLY JOURNALED SPINDLE

[75] Inventors: Gunther Wendel; Heinz Meissler, both of Stuttgart, Germany

[73] Assignee: SKF Kugellagerfabriken, Schweinfurt, Germany

[22] Filed: June 12, 1973

[21] Appl. No.: 369,223

[30] Foreign Application Priority Data
June 15, 1972 Germany............................ 2229111
May 11, 1973 Germany............................ 2323850

[52] U.S. Cl................................. 308/152; 308/228
[51] Int. Cl.². ..................F16C 19/10; F16C 35/08; F16C 35/12; F16C 41/00
[58] Field of Search............ 308/4 R, 150, 151, 152, 308/153, 154, 155, 156, 228

[56] References Cited
UNITED STATES PATENTS

| | | | |
|---|---|---|---|
| 234,522 | 11/1880 | Birkenhead.......................... | 308/152 |
| 793,208 | 6/1905 | Miller................................ | 308/41 R |
| 1,061,267 | 5/1913 | Chapman........................... | 308/228 |
| 1,478,048 | 12/1923 | Munzenmaier et al............. | 308/228 |
| 1,911,329 | 5/1933 | Staufert.............................. | 308/228 |

FOREIGN PATENTS OR APPLICATIONS

| | | | |
|---|---|---|---|
| 1,535,061 | 7/1970 | Germany............................ | 308/228 |
| 373,674 | 1/1964 | Switzerland....................... | 308/228 |

Primary Examiner—M. Henson Wood, Jr.
Assistant Examiner—Howard Beltran

[57] ABSTRACT

An assembly for journalling spindle shafts in spinning and twisting machines. At least one resilient elongated member, such as a bar spring interconnects the neck and foot bearing. The neck and foot bearing are secured firmly to the respective ends of the resilient member.

22 Claims, 6 Drawing Figures

RESILIENTLY JOURNALED SPINDLE

BACKGROUND OF INVENTION

The present invention relates to apparatus for journalling the spindle of spinning frames and twisting frames.

In general, the spindle of a conventional spinning and twisting frame is journalled in a housing or bolster by a radial neck bearing surrounding its upper portion and a foot bearing axially supporting its lower end. It is the primary object of the present invention to provide an elastic yieldable connection between the neck and foot bearings so that the operating and running characteristics of the spindle are greatly improved and a more quiet and smooth operation is obtained.

Many attempts have been made in the past to obtain a more smooth and quiet running spindle. These attempts have all been rather expensive and of complex structure. For example, the neck and foot bearings were generally connected by a centering tube or sleeve which was provided with a helical slot which permitted the tube a certain degree of flex. The helical slot together with the strength of the material itself which formed the wall of the centering tube, cooperated to define the resiliency of the tube. The centering tube absorbed the operating oscillation and vibrations of the spindle and thus permitted it to run truer with respect to its axis of rotation. In German patent specification No. DT-PS494485, corresponding to U.S. Pat. No. 1,911,329 it was suggested to provide the inside of the housing or bolster with a screw threaded surface to the mid-section of which was secured a coil spring. At one end of the coil spring there was attached the neck bearing and while at the other end there was attached the foot bearing. By this arrangement the neck and the foot bearings were yieldably connected to each other and also yieldably connected with respect to the spindle housing or bolster. Nevertheless because of the need to make the coil spring elastic the material used was not sufficiently strong to withstand the high rotating speeds of the spindle and frequent breakdowns occurred. Furthermore, this construction did not permit the use of additional damping means for resiliently supporting the foot and/or neck bearings.

The present invention has as its object the provision of a journal for a spindle in a spinning and/or twisting frame wherein the neck and foot step bearings may be yieldably connected with each other and/or yieldably connected with the spindle housing or bolster.

It is another object of the present invention to provide a journal for a spindle of the type described wherein the degree of yield and the resilient connection may be adjustably and variably fixed within certain predefined limits.

It is a further object of the present invention to provide apparatus for journalling the spindle of the type described which is simple and inexpensive.

It is still another object of the present invention to provide apparatus for journalling a spindle in a spinning and twisting frame which overcomes the disadvantages and defects of the prior devices.

These objects, other objects as well as numerous advantages are clearly set forth in the following disclosure of the present invention.

SUMMARY OF INVENTION

According to the present invention apparatus for journalling the spindle of a spinning and/or twisting frame is provided wherein the neck bearing and the foot bearing are connected by at least one bar spring. The bar spring is connected at one end to the neck bearing and at the other end to the foot step bearing and preferably extends parallel to the axis of the spindle.

As a result of this construction very advantageous operating conditions are established wherein the spindle may be permitted to rotate at very high speed and yet a smooth and quiet running is obtained.

While it is preferred that a plurality of bar springs be employed, which are uniformly spaced about the spindle axis, the number of bar springs is not critical nor is their arrangement in a uniform manner absolutely required. Various arrangements are shown herein.

In a preferred form of the invention the bar springs are held in a position between the neck and foot step bearings in a collar or a holder which is secured at its outer periphery on the inner wall of the spindle housing or bolster. In this manner the neck and foot step bearings are yieldably movable with respect to each other as well as with respect to a fixed position on the bolster itself. As a result a simple arrangement is provided wherein the spindle can be held in the spindle housing or bolster under an elastic and yieldable connection with the neck and foot step bearings.

Full details of the present invention are given in the following description and are shown in the accompanying drawings.

DESCRIPTION OF INVENTION

Figure 1:
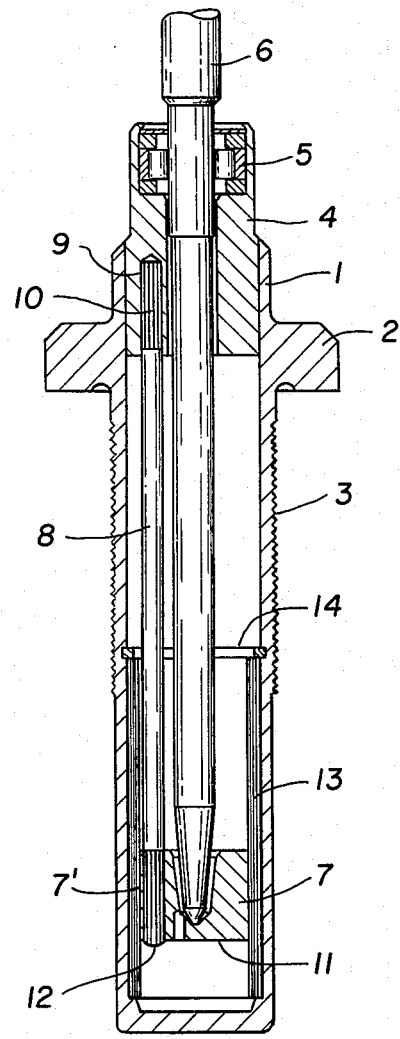
FIG. 1 is a longitudinal section through a spindle bolster showing the connection of the neck and foot step bearings in accordance with the present invention.
Figure 1A:
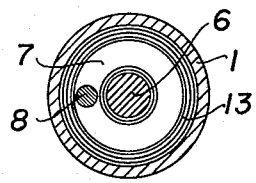
FIG. 1a is a top plan view of the foot bearing.

A spindle bearing housing or bolster 1 of conventional design is seen in FIG. 1. The bolster is adapted to sit within a hole formed in a spindle bank with its radial flange 2 resting on the upper surface of the bank. The bolster is secured by a nut screwed beneath the spindle bank on its exterior threaded surface 3. The bolster is closed at its lower end and has press fit or similarly secured at its upper end a plug-like insert 4 in the top of which is secured a neck bearing 5 comprising a conventional radial roller bearing of the type commonly employed in similar spindle arrangements. Extending through the neck bearing 5, the insert 4 and the bolster 1 is the shaft 6 of a conventional spindle. The lower end of the spindle shaft 6 rests within an axial foot step bearing 7 which may also be of conventional construction. In accordance with the present invention the neck bearing 5 and the foot bearing 7 are connected by a bar spring 8 which extends parallel to the shaft 6 and which is fastened at each end in the neck and foot step bearing respectively.

To secure the upper end of the bar spring 8 within the insert 4, the insert 4 is provided with a blind bore 9 into which the bar 8 is press fit. The end of the bar may be provided with riflings or splines 10 so that it more securely fits within the blind bore 9. On the other hand the foot bearing 7 is provided with a through bore 7' through which the lower end of the bar spring 8 extends to a point beyond the lower face 11 of the foot step bearing 7. This lower end of the bar 8 is formed with a flanged head 12 which secures the bar in place.

The diameter and the material of the bar 8 are so chosen that the axially extending bar, parallel to the spindle shaft 6, produces a yielding bias between the foot bearing 7 and the neck bearing 5 so that a smooth and quiet running of the spindle and a resiliently yieldable bearing apparatus for the spindle is obtained.

To further dampen the oscillation of the foot bearing a conventional damping coil 13 surrounds the foot bearing 7 between it and the inner wall of the bolster 1. The damping coil 13 comprises a helical member extending from the lower end of the bolster axially along the inner wall thereof and is secured in its position by a split ring 14 or similar spring-like nut seated in an annular groove formed in the inner wall of the bolster. The nut 14 prevents axial movement of the helix with respect to the bolster.

Figure 2:
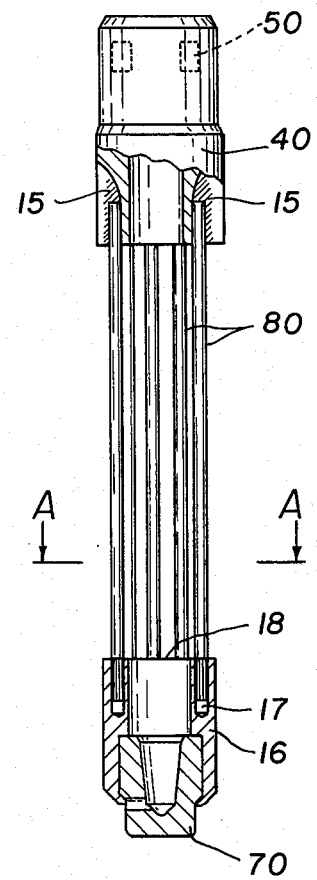
FIG. 2 is a detailed view of an assembly of neck and foot step bearing with a plurality of bar spring connection means, FIG. 2 being broken and showing portions in section.
Figure 2A:
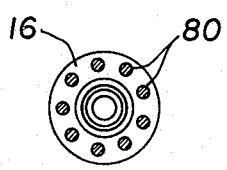
FIG. 2a is a top plan view of the foot bearing.

In FIG. 2 an assembly of a neck and foot step bearing connected by means of the plurality of yieldably resilient rod-like spring members is shown without reference or connection to the bolster or bearing housing. Here, a neck bearing 50 and a foot step bearing 70 are yieldably connected relative to each other by a plurality of bar springs 80 which are secured at their upper ends in a slotted opening 15 formed in the end of the neck bearing insert 40. The bar springs can be secured in the opening 15 by filling the openings with solder material, lead or the like. On the other hand, the opening 15 may be mechanically deformed along its edges so that the material is upset to hold and grasp the ends of the bar spring securely. The lower ends of each of the bar springs 80 are securely held in a sleeve 16 in which the foot bearing 70 is secured. The sleeve 16 is provided with a series of blind holes 17 into each of which the end of a bar spring 80 is inserted. The lower end of the bar springs 18 may be rifled or splined and press fit into the blind bores 17 in the manner described in connection with the embodiment of FIG. 1. Further, the end of each of the bar springs 80 is slightly smaller in diameter than the rest of the bar so that a shoulder is provided which when placed against the frontal edge 18 of the sleeve 16 provides a predefined and fixed position for the bar spring. Thus, the lengths of the bar springs may be fixed so that they are uniform with each other.

As seen from the middle of the FIG. 2, which is a sectional view taken from above the sleeve 16, the yieldable resilient connection between the neck and foot step bearing is formed by a plurality of uniformly spaced bar springs lying in a circular path coaxially about the spindle axis. Each of the bar springs 80 has a circular cross section. In order to match the running characteristics of the spindle with the yieldable resilient bias so as to maintain an optimal and maximal operation, varying choice and selection of material and diameter of the bar springs 80 can be made. In addition, the number of bar springs can be varied from those shown in FIG. 2 and the bars may also be arranged non-uniformly spaced from each other and in other than a circular orbit about the spindle. Furthermore, they may have a cross section other than a circular rod. Lastly, the assembly of FIG. 2 can also be made with one bar spring as shown in FIG. 1.

The assembly shown in FIG. 2 comprises a unitary whole which can be pre-assembled and stored and transported in this condition. It may thus be easily inserted in a conventional bolster and provided with a damping coil as seen in FIG. 1 or with other conventional damping means.

Figure 3:
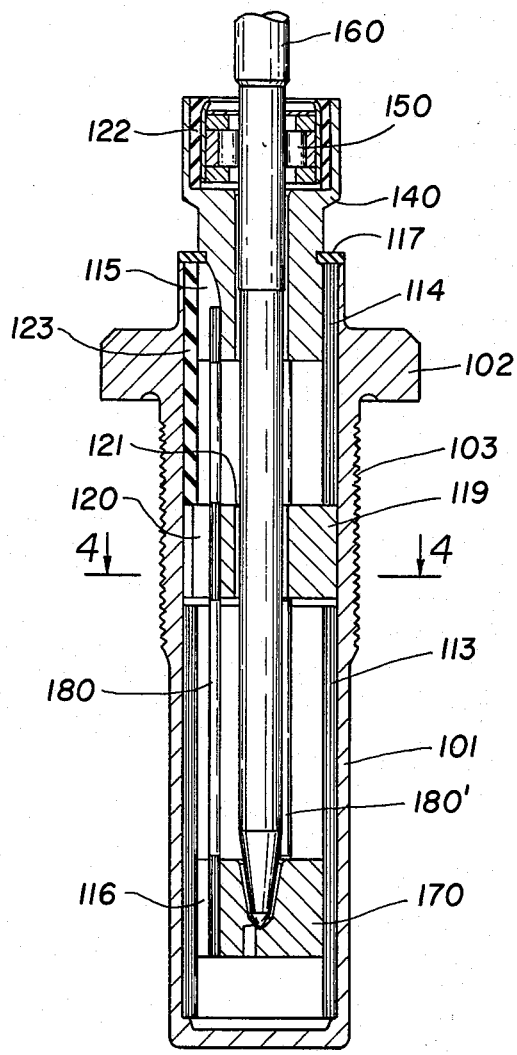
FIG. 3 is a sectional view similar to that of FIG. 1 showing still another embodiment of the present invention.
Figure 4:
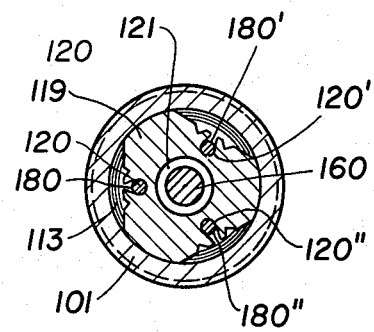
FIG. 4 is a sectional view taken along line 4—4 of FIG. 3.

In the embodiment shown in FIGS. 3 and 4, a spindle housing 101 is mounted in conventional manner by its flange 102 and its threaded exterior 103 in a hole in the conventional spindle bank. A plug-like insert 104 which holds the neck bearing 150 is secured at the upper end of the bolster. A spindle shaft 160 extends downwardly through the neck bearing, the insert 140 and is axially seated on a foot step bearing 170. The neck bearing 160 and the foot bearing 170 are connected by three bar springs 180, 180' and 180''. These bar springs are secured at their upper end in slots 115 formed in the neck bearing insert 140. The securement of this upper end of the bar springs can be made in such a manner as that described in connection with the earlier embodiment by filling the slot with solder or similar material or by deforming the edges of the slotted portion of the insert 140. The lower end of each of the bars 180, 180' and 180'' are secured in a similar manner in slots 116 formed in the foot bearing 170. Both ends of the bar may be splined or rifled to assist in its securement.

The bars 180, 180' and 180'' are held in an annular supporting collar 119. The collar 119 has a plurality of axially extending holes 120, 120' and 120'' conforming to the number of bar springs 180, which extend parallel to its central axis. The holes are formed by slotting the collar 119 radially from its peripheral edge so that the spring bars 180 may be inserted therein and maintained in their axially parallel relationship to the central axis of the spindle. As described in connection with the securing of the lower end of the bar spring in the foot step bearing 170 as indicated in FIG. 3, the slots which are first formed in the collar 119 may be filled with solder or other material to hold the bar spring or may be physically deformed and upset so as to crimp the bar spring within the axial journal 120, as indicated in FIG. 4. Other means may be used to secure the bar spring within the collar 119 as will be obvious. If desired the portion of the bar spring which is within the collar 119 may also be provided with rifling and/or splines. In any event the bar springs 180 are held within the holes 120 so that they maintain an axially parallel and uniformly spaced arrangement with respect to the axis of the spindle shaft 6.

The central bore 121 of the annular collar 119 has a diameter which is slightly greater than the diameter of the spindle shaft 6 so that a degree of radial play is provided. On the other hand the outer diameter of the collar 119 is somewhat larger than the neck bearing insert 140 and the foot bearing 170 so that it fits tightly within the inner diameter of the bolster and is securely press fit in place so that it is fixed against movement relative to the bolster. In this manner an elastically yieldable connection is obtained between the neck and the foot bearings themselves as well as between the neck and foot bearings and the bolster housing respectively. Thus, the neck bearing insert 140 has a degree of movement relative to the bolster 101 as well as relative to the foot bearing 170. Similarly, the foot bearing 170 has a degree of relative movement with respect to the neck bearing insert 140 as well as with the bolster 101. Since the collar 119 is securely fixed to the bolster 101 it is in turn firmly connected or grounded to the spindle bank (not shown). Consequently the rotating spindle shaft 160 is carried, spaced from the walls of the spindle bolster in a freely movable and yieldable journal comprising the neck and foot bearing which in turn are firmly connected to the fixed spindle bank.

The degree of elasticity of the connection between the bearings and between the bearings and the bolster is adjustable and determinable within limits and can be easily matched to the desired requirements, without departing from the basic structure as shown. To obtain the selected degree of elasticity, the material, the dimensions of the bar springs as well as the number of bar springs can be varied and can be determined to provide the desired degree of yield. The three bar springs shown in FIGS. 3 and 4 may be replaced with any number of bar springs as for example the number shown in the embodiment of FIG. 2. The relative distance between the neck and foot bearings with respect to the collar 119 can also be varied. As seen in FIG. 3 the distance between the collar 119 and the neck bearing is less than the distance between the collar 119 and the foot bearing. By arranging the collar 119 in this off centered position, a greater degree of elasticity is provided for the foot bearing 170 than for the neck bearing 150. By predetermining the position of the collar 119 along the length of the bar springs the relative degree of yield can be determined. This variable degree of yield or elasticity can be obtained even with a central positioning of the collar 119 or even with an off center arrangement the degree of elasticity can be further varied, by making the portion of the bar spring between the collar 119 and the foot bearing 170 of a different dimension than the portion between the collar 119 and the neck bearing 150. In this way the bar springs above and below the collar will have a different degree of oscillation and resonance as well as a different degree of radial and axial elasticity. Still another way of making the yield different is to arrange a different number of bar springs between the collar and the foot bearing as between the collar and the neck bearing. This also provides a relatively different spring constant above and below the collar. It is also possible, that instead of connecting the neck to the foot bearing, the collar 119 is connected to only one of the bearings. Similarly, two collars may be used each connected to their respective bearing. Lastly, the degree of elasticity or spring yield can be modified or varied further by employing a bar of different configuration than that shown in the drawings. For example, a conical, square, oval or other sectional form can be used rather than the circular sectional profile indicated.

In all cases, however, the elastic effect of the bar springs can be augmented by the use of conventional and well known damping means. As will be seen in FIG. 3 such means are provided. The foot bearing 170 is surrounded by an oil-damping helical coil 113 which extends axially from the bottom of the bolster 101 into contact with the lower surface of the collar 119. an additional damping coil 114 (seen on the right half of FIG. 3) may be placed to surround the neck bearing insert 140 to extend axially between the top surface of the collar 119 and the top edge of the bolster 101. The top edge of the bolster 101 is closed by an elastic closure ring 117 which is resiliently secured in an annular groove formed about the outer periphery of the insert 140. Preferably the closure ring 117 is made of such an elastic material that it seats against the upper end of the bolster 101 and closes its interior so as to prevent the escape of lubricant and/or damping oil without interfering with the radial movement of the insert 140. The closure ring 117 also fixes the second damping coil 114 against axial movement.

As seen in FIG. 3, the collar 119 is press fit securely within the interior of the bolster 101. It can however be placed in its desired position by forming a shallow recess within the inner surface of the bolster or by providing the bolster with at least one rim or edge against which the piece 119 can be seated.

The damping coils 113 and 114 can be varied in their effect by modifying their structural form, that is by selecting the strength of the material forming the coil or by selecting the number of windings into which the coil is turned. Different damping values may be employed for each of the neck or foot bearing ends respectively. Different damping means may also be employed for each of the neck and foot bearings. For example, the foot bearing 170 can be surrounded by an oil damping coil 113 as shown in the drawing, while the bearing insert 140 can employ a damping sleeve 123 (indicated on the left side of FIG. 3). The damping sleeve 123 may be made of an elastic material such as rubber, synthetic rubber or synthetic plastics. Such a damping sleeve does not require oil or other lubricant and thus the upper portion of the bolster 101 does not need to have such material supplied to it nor is it required to form an oil reservoir. The present invention provides a simple elastic and yieldable spring-like connection and damping arrangement between the neck and foot bearing. The bar springs enable the maintenance of the neck and foot bearings in a pre-defined axial distance from each other but permit their freedom of radial movement, oscillation and vibration independent of each other so that a smoother and more efficient running of the spindle shaft is obtained at a substantial reduction of the noise level over those arrangements known in the prior art. This arises because there is no fixed stationary connection between the bearings and the spindle bolster or the spindle bank by which noise may be transmitted.

Additional advantages are obtained in the elimination of noise by placing an additional damping means about the neck bearing. As seen in FIG. 3 the neck bearing 150 is surrounded by an elastic sleeve or ring 122 which is interposed between the bearing and the wall of the carrier insert 140. The material from which the ring 122 is made may be rubber or similar dampening material and may be secured as by gluing to the inner wall of the insert 140.

It will be seen from the foregoing that numerous modifications, changes and varying embodiments may be made without departing from the scope of the present invention. Accordingly, it is intended that the disclosure be taken as illustrative only and not as limiting of the scope of the invention.

What is claimed:

1. An assembly for journalling the shaft of a the spindle of a spinning and twisting frame comprising a bearing housing having a neck bearing at the upper end and a foot bearing at the lower end, each of said neck and foot bearing being mounted in a bearing mount located within said housing, at least one of said neck and foot bearing mounts being axially movable with respect to said housing and at least one elongated tension spring fixedly connected at its respective ends to said neck and foot bearing mounts so as to yieldably space said neck and foot bearings from each other.

2. The assembly according to claim 1 wherein said tension spring comprises a bar spring.

3. The assembly according to claim 2 wherein the ends of said bar spring are splined.

4. The assembly according to claim 1 wherein said bar spring extends parallel to the axis of said spindle shaft.

5. The assembly according to claim 1 wherein said recess is a blind bore.

6. The assembly according to claim 1 wherein said recess is a through bore.

7. The assembly according to claim 1 wherein said recess is an axial slot.

8. The assembly according to claim 1 wherein the ends of said tension spring are shaped to provide secure fastening.

9. The assembly according to claim 1 including means for resiliently securing said neck bearing in said housing.

10. The assembly according to claim 1 including damping means interposed between said housing and at least one of said neck and foot bearings.

11. The assembly according to claim 10 wherein said neck bearing is provided with damping means comprising an enclosure of elastic material and said foot bearing with an oil-damping coil.

12. The assembly according to claim 1 wherein said movable neck and foot bearing mounts are removably secured in housing.

13. The assembly according to claim 1 wherein said neck and foot bearing mounts are respectively provided with recesses for receiving and securing the respective ends of the tension spring.

14. The assembly according to claim 13 including a plurality of spring bars spaced parallel to each other about the axis of the spindle shaft.

15. The assembly according to claim 14 wherein said spring bars are uniformly spaced in a circular path about the axis of the spindle.

16. The assembly according to claim 15 including an annular collar located axially between said neck and foot bearing, said spring bars extending through said collar, said collar being removably fastened to said housing.

17. The assembly according to claim 16 wherein said collar is located eccentric of the axial center between said neck and foot bearings.

18. The assembly according to claim 16 wherein said collar has an outer diameter greater than the outer diameter of said foot and neck bearings so as to be axially secured within said housing.

19. The assembly according to claim 16 wherein said collar has an inner diameter larger than the diameter of said spindle shaft.

20. The assembly according to claim 16 wherein said collar is provided with axial slots for receiving and fixedly securing said spring bars.

21. The assembly according to claim 20 wherein the edges of said slots are mechanically deformed to fixedly secure said spring bars.

22. The assembly according to claim 20 wherein said slots are filled to fixedly secure said resilient members.

* * * * *